United States Patent
Jacobs et al.

(10) Patent No.: US 10,753,459 B2
(45) Date of Patent: Aug. 25, 2020

(54) TRANSMISSION BRAKING FOR VEHICLE SPEED CONTROL

(71) Applicants: Brian J Jacobs, Romeo, MI (US); Joshua Haviland, Auburn Hills, MI (US); Michael Sowards, Clarkson, MI (US)

(72) Inventors: Brian J Jacobs, Romeo, MI (US); Joshua Haviland, Auburn Hills, MI (US); Michael Sowards, Clarkson, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/416,993

(22) Filed: May 20, 2019

(65) Prior Publication Data

US 2019/0368601 A1 Dec. 5, 2019

Related U.S. Application Data

(60) Provisional application No. 62/677,698, filed on May 30, 2018.

(51) Int. Cl.
| | | |
|---|---|---|
| *F16H 61/00* | (2006.01) | |
| *F16H 63/34* | (2006.01) | |
| *F16H 61/02* | (2006.01) | |
| *F16H 59/70* | (2006.01) | |
| *F16H 59/66* | (2006.01) | |
| *F16H 59/74* | (2006.01) | |
| *F16H 59/44* | (2006.01) | |

(52) U.S. Cl.
CPC ...... *F16H 61/0059* (2013.01); *F16H 61/0202* (2013.01); *F16H 63/3425* (2013.01); *B60Y 2300/143* (2013.01); *F16H 59/44* (2013.01); *F16H 59/66* (2013.01); *F16H 59/70* (2013.01); *F16H 59/74* (2013.01); *F16H 2059/663* (2013.01)

(58) Field of Classification Search
CPC .......... F16H 59/44; F16H 59/70; F16H 59/74; F16H 2059/663; F16H 61/0059; F16H 61/0202
See application file for complete search history.

(56) References Cited

U.S. PATENT DOCUMENTS

| | | |
|---|---|---|
| 4,314,487 A | 2/1982 | Ahlen |
| 4,844,223 A | 7/1989 | Kempf et al. |

(Continued)

*Primary Examiner* — Edwin A Young
(74) *Attorney, Agent, or Firm* — Ralph E Smith

(57) ABSTRACT

A vehicle transmission braking mode comprises determining a set of available clutches of the plurality of clutches that are not being utilized for engagement of a particular forward gear of the plurality of forward gears, determining at least one of a modeled temperature, a measured temperature, and a modeled energy of each clutch of the set of available clutches to obtain a set of at least one of clutch temperatures and energies, and based on at least the set of available clutches and the set of at least one of clutch temperatures and energies, selectively operate the transmission in the transmission braking mode by at least partially applying at least one clutch of the set of available clutches to mitigate or prevent powerflow through the transmission and thereby decrease or maintain a speed of the vehicle and/or reduce acceleration of the vehicle.

13 Claims, 8 Drawing Sheets

(56) References Cited

U.S. PATENT DOCUMENTS

| | | | |
|---|---|---|---|
| 5,873,802 A * | 2/1999 | Tabata | B60K 28/165 |
| | | | 180/197 |
| 7,513,848 B2 * | 4/2009 | Inoue | F16H 3/006 |
| | | | 192/103 C |
| 8,924,061 B2 | 12/2014 | Reed et al. | |
| 9,248,829 B2 | 2/2016 | Reed et al. | |
| 9,387,848 B2 | 7/2016 | Petzold et al. | |
| 9,873,431 B2 | 1/2018 | Sowards et al. | |
| 2003/0199356 A1 | 10/2003 | Biallas | |
| 2005/0267665 A1 | 12/2005 | Iwatsuki et al. | |
| 2005/0282683 A1 * | 12/2005 | Tanba | B60W 10/113 |
| | | | 477/180 |
| 2011/0251747 A1 * | 10/2011 | Imai | B60W 20/30 |
| | | | 701/22 |
| 2015/0266479 A1 | 9/2015 | Blakeway et al. | |

* cited by examiner

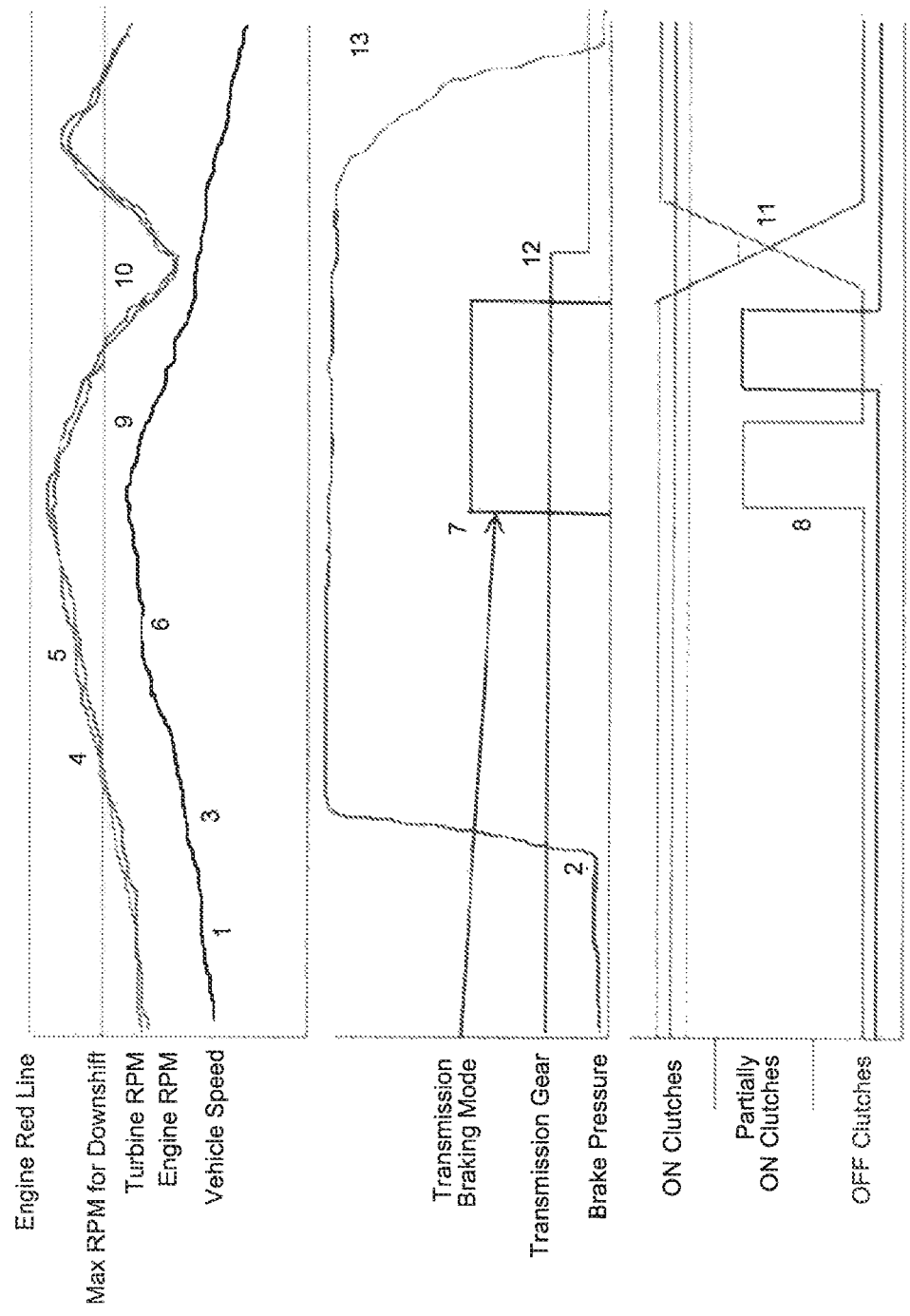

TRANSMISSION BRAKING FOR VEHICLE SPEED CONTROL

CROSS-REFERENCE TO RELATED APPLICATIONS

This application claims benefit of U.S. Provisional Application Ser. No. 62/677,698 filed on May 30, 2018. The disclosure of the above application is incorporated herein by reference in its entirety.

FIELD

The present application relates generally to vehicle transmissions and, more particularly, to a transmission braking mode of an automatic transmission and method of using the same for improved vehicle braking and/or speed reduction performance.

BACKGROUND

Vehicles include a torque generating system (e.g., an engine, an electric motor, or combinations thereof) that generates drive torque for vehicle propulsion. The drive torque is transferred from the torque generating system to a driveline of the vehicle via a transmission. One type of transmission is an automatic transmission, which comprises a plurality of clutches and a plurality of gears that are selectively apply to achieve a desired gear ratio for transfer of the drive torque. A braking system is typically utilized to decrease or otherwise regulate a speed of the vehicle, such as during normal driving, cruise control, or during downhill assist. Exhaust braking on turbogas and turbodiesel engines or engine braking on naturally aspirated engines or engines not equipped with an exhaust brake could be utilized to provide additional braking, such as in these downhill assist scenarios. Exhaust braking and engine braking in addition to a conventional braking system, however, still may not be able to achieve the full desired braking effect in certain scenarios. Thus, while these vehicle systems do work well for their intended purpose, there remains a need for improvement in the relevant art.

SUMMARY

According to one example aspect of the invention, a transmission system for a vehicle is presented. In one exemplary implementation, the system comprises: an automatic transmission comprising a plurality of clutches and a plurality of gears, the automatic transmission being configured to transfer drive torque from a torque generating system of the vehicle to a driveline of the vehicle and a controller configured to: determine a set of available clutches of the plurality of clutches of the transmission that are not being utilized for engagement of a current gear of the transmission, determine at least one of a modeled temperature, a measured temperature, and a modeled energy of each clutch of the set of available clutches to obtain a set of at least one of clutch temperatures and energies, and based on at least the set of available clutches and the set of at least one of clutch temperatures and energies, selectively operate the transmission in a transmission braking mode that includes at least partially applying at least one clutch of the set of available clutches to absorb frictional energy and decrease or maintain a speed of the vehicle or to reduce acceleration of the vehicle.

In some implementations, the controller is configured to periodically at least partially apply at least one clutch of the set of available clutches. In some implementations, the set of available clutches comprises at least a first available clutch and at least one second available clutch, and wherein the controller is configured to periodically and intermittently at least partially apply the first and the at least one second available clutch.

In some implementations, the controller is further configured to: detect a park request provided by a driver of the vehicle or generated by an auto-park feature of the vehicle, when the park request is detected and the vehicle speed is above a park speed threshold, operate the transmission in the transmission braking mode to decrease the vehicle speed to zero or within a threshold from zero, and upon the vehicle speed decreasing to zero or within the threshold from zero, engage a park pawl system to stop the vehicle.

In some implementations, the controller is further configured to: determine whether a cruise control mode of the vehicle is active, and when the cruise control mode of the vehicle is active and the vehicle speed is above a cruise control speed setpoint, operate the transmission in the transmission braking mode to decrease the vehicle speed to the cruise control speed setpoint or within a threshold from the cruise control speed setpoint.

In some implementations, the controller is further configured to: determine whether an exhaust braking speed hold mode of the vehicle is active, and when the exhaust braking speed hold mode of the vehicle is active, operate the transmission in the transmission braking mode to decrease the vehicle speed to a speed hold setpoint or within a threshold from the speed hold setpoint.

In some implementations, the controller is further configured to: determine whether an engine braking speed hold mode of the vehicle is active, and when the engine braking speed hold mode of the vehicle is active, operate the transmission in the transmission braking mode to decrease the vehicle speed to a speed hold setpoint or within a threshold from the speed hold setpoint.

In some implementations, the controller is configured to operate the transmission in the transmission braking mode when the vehicle is traveling downhill and a downshift of the transmission cannot be performed. In some implementations, the controller is configured to operate the transmission in the transmission braking mode in response to a manual activation request provided by a driver of the vehicle.

In some implementations, the transmission is an eight-speed automatic transmission comprising five clutches where two of the five clutches are available clutches in each of eight forward drive gears and a reverse gear.

In some implementations, the controller is further configured to: based on at least the set of available clutches and the set of at least one of clutch temperatures and energies, determine a need to exit the transmission braking mode, in response to determining the need to exit the transmission braking mode: determine a different set of available clutches that would be available in a different gear of the transmission, determine at least one of a modeled temperature, a measured temperature, and a modeled energy of each clutch of the different set of available clutches to obtain a different set of at least one of clutch temperatures and energies, and based on at least the different set of available clutches and the different set of at least one of clutch temperatures and energies, determine whether the transmission braking mode could be extended by shifting the transmission to the different gear, and when the transmission braking mode can be extended by shifting the transmission to the different gear:

command the transmission to shift to the different gear, and based on at least the different set of available clutches and the different set of at least one of clutch temperatures and energies, at least temporarily continue operating the transmission in the transmission braking mode including at least partially applying at least one clutch of the different set of available clutches to absorb frictional energy and decrease or maintain the speed of the vehicle or to reduce acceleration of the vehicle.

According to another example aspect of the invention, a transmission system for a vehicle is presented. In one exemplary implementation, the system comprises: an automatic transmission comprising a plurality of clutches and a plurality of gears, the automatic transmission being configured to transfer drive torque from a torque generating system of the vehicle to a driveline of the vehicle, and a controller configured to: determine a set of clutches of the plurality of clutches of the transmission that, when at least partially applied, provide a lockup state of the transmission whereby powerflow therethrough is mitigated or prevented, determine at least one of a modeled temperature, a measured temperature, and a modeled energy of each clutch of the set of clutches to obtain a set of at least one of clutch temperatures and energies, and based on at least the set of clutches and the set of at least one of clutch temperatures and energies, selectively operate the transmission in a transmission braking mode that includes at least partially applying the set of clutches to provide the lockup state of the transmission and thereby absorb frictional energy and decrease or maintain a speed of the vehicle or to reduce acceleration of the vehicle.

In some implementations, the controller is further configured to: detect a park request provided by a driver of the vehicle or generated by an auto-park feature of the vehicle, when the park request is detected and the vehicle speed is above a park speed threshold, operate the transmission in the transmission braking mode to decrease the vehicle speed to zero or within a threshold from zero, and upon the vehicle speed decreasing to zero or within the threshold from zero, engage a park pawl system to stop the vehicle.

In some implementations, the controller is further configured to: determine whether a cruise control mode of the vehicle is active, and when the cruise control mode of the vehicle is active and the vehicle speed is above a cruise control speed setpoint, operate the transmission in the transmission braking mode to decrease the vehicle speed to the cruise control speed setpoint or within a threshold from the cruise control speed setpoint.

In some implementations, the controller is further configured to: determine whether an exhaust braking speed hold mode of the vehicle is active, and when the exhaust braking speed hold mode of the vehicle is active, operate the transmission in the transmission braking mode to decrease the vehicle speed to a speed hold setpoint or within a threshold from the speed hold setpoint.

In some implementations, the controller is further configured to: determine whether an engine braking speed hold mode of the vehicle is active, and when the engine braking speed hold mode of the vehicle is active, operate the transmission in the transmission braking mode to decrease the vehicle speed to a speed hold setpoint or within a threshold from the speed hold setpoint.

In some implementations, the controller is configured to operate the transmission in the transmission braking mode when the vehicle is traveling downhill and a downshift of the transmission cannot be performed. In some implementations, the controller is configured to operate the transmission in the transmission braking mode in response to a manual activation request provided by a driver of the vehicle.

In some implementations, the transmission is an eight-speed automatic transmission comprising five clutches. In some implementations, a braking system of the vehicle is not activated during the transmission braking mode.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF DRAWINGS

FIG. 5B is a graphical illustration of vehicle parameters and/or responses in connection with an example vehicle downhill braking assistance scenario utilizing the transmission braking mode according to the principles of the present disclosure.

DESCRIPTION

As discussed above, there remains a need for improvement in vehicle braking and speed control. Accordingly, systems and methods for vehicle braking and speed control using existing components of an automatic transmission are presented. As discussed above, an automatic transmission comprises a plurality of clutches and a plurality of gears. However, not all of the clutches of the transmission are always being applied or engaged for the various gears. Thus, at least some of these available clutches could be applied in these scenarios to absorb frictional energy and decrease or maintain the vehicle's speed or decrease its acceleration, thereby extending a life of the vehicle's braking system and/or improving braking performance. Alternatively, the transmission could intentionally be transitioned to a lockup state where powerflow between the applied or engaged clutches cannot occur to similarly absorb frictional energy and decrease the vehicle's speed. This is also referred to herein as a "transmission braking mode." Potential benefits of this transmission braking mode include, but are not limited to, decreased burden or wear on the service brake system, improved cruise control accuracy, mitigation or elimination of shock loading to a transmission park pawl, downhill braking and/or exhaust braking assistance, and driver-requestable transmission braking mode (e.g., via a button or other user interface device). The transmission braking mode could also be applicable to both normal driving conditions as well as abnormal conditions (e.g., in response to detection by overwatch monitoring software or a driver-initiated request via a button or other input device). Non-limiting examples of these abnormal conditions include poor driver skill, poor vehicle maintenance, and improper vehicle loading.

Figure 1:
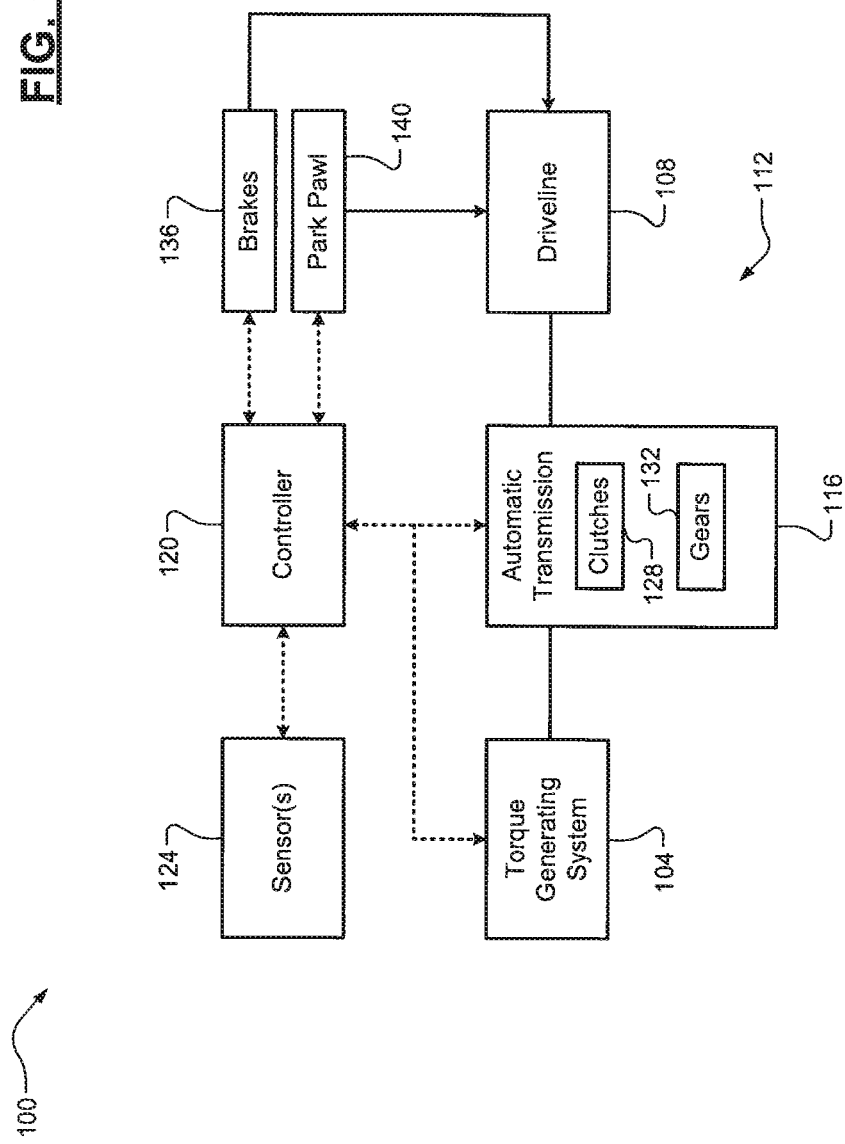
FIG. 1 is a functional block diagram of an example vehicle having a transmission system configured with a transmission braking mode according to the principles of the present disclosure.

Referring now to FIG. 1, a functional block diagram of an example vehicle 100 is illustrated. The vehicle 100 comprises a torque generating system 104 (an engine, an electric motor, combinations thereof, etc.) that generates drive torque that is transferred to a driveline 108 via an automatic transmission system 112. The automatic transmission system 112 generally comprises an automatic transmission 116 and a controller 120, but it will be appreciated that the system 112 could also include one or more sensors 124. Non-limiting examples of these sensors 124 include a vehicle speed sensor, an engine torque sensor, a turbine torque sensor, an accelerometer, a wheel speed sensor, an engine speed sensor, transmission input/output shaft speed sensors, a park lock sensor, a gear select shifter sensor, an accelerator pedal sensor, a service brake pedal sensor, a transmission brake button sensor, a gear hold button sensor, a tow/haul button sensor, an exhaust brake sensor, a global positioning satellite system (GPS) sensor, and/or an altitude or inclinometer sensor. The parameters measured by the sensor(s) 124 are utilized, for example, to determine whether or not a transmission braking mode can be enabled. The vehicle 100 further comprises a braking system 136 that applies a frictional braking force at the driveline 108 based on a built-up brake pressure in response to, for example, depression of a brake pedal (not shown), and a park pawl system 140 that engages a park pawl to stop the vehicle 100 in response to, for example, a park request via a transmission gear selector (not shown). An auto-park feature or system could also be included to automatically generate a park request to prevent the vehicle 100 from potentially rolling away when the driver tries to get out of their vehicle 100 when it is not in park.

The transmission 116 comprises a plurality of clutches 128 and a plurality of gears 132. In one exemplary implementation and as will be discussed below by way of example with reference to an eight speed configuration of the transmission 116, the transmission braking mode of the present disclosure may be implemented while taking advantage of existing controllable clutches 128 within the transmission 116. In one exemplary implementation, the clutches 128 are electro-hydraulically controlled clutches, although one skilled in the art will appreciate that other controllable clutch type or torque transfer device arrangements may be utilized in connection with the example eight speed configuration or a transmission 116 having more or less speeds. In one exemplary implementation, the transmission braking mode uses only existing clutches 128 provided with the respective transmission 116 used to establish power flow. In the exemplary eight speed configuration, five clutches 128 are utilized in various combinations of three to establish eight forward gears 132 or speeds, and only one or more of these clutches 128 are selectively utilized by the transmission braking mode. As previously mentioned herein and as discussed in greater detail below, there are also clutch combinations that will result in a lockup state of the transmission 116 as an alternate way to achieve the transmission braking mode.

Figure 2:
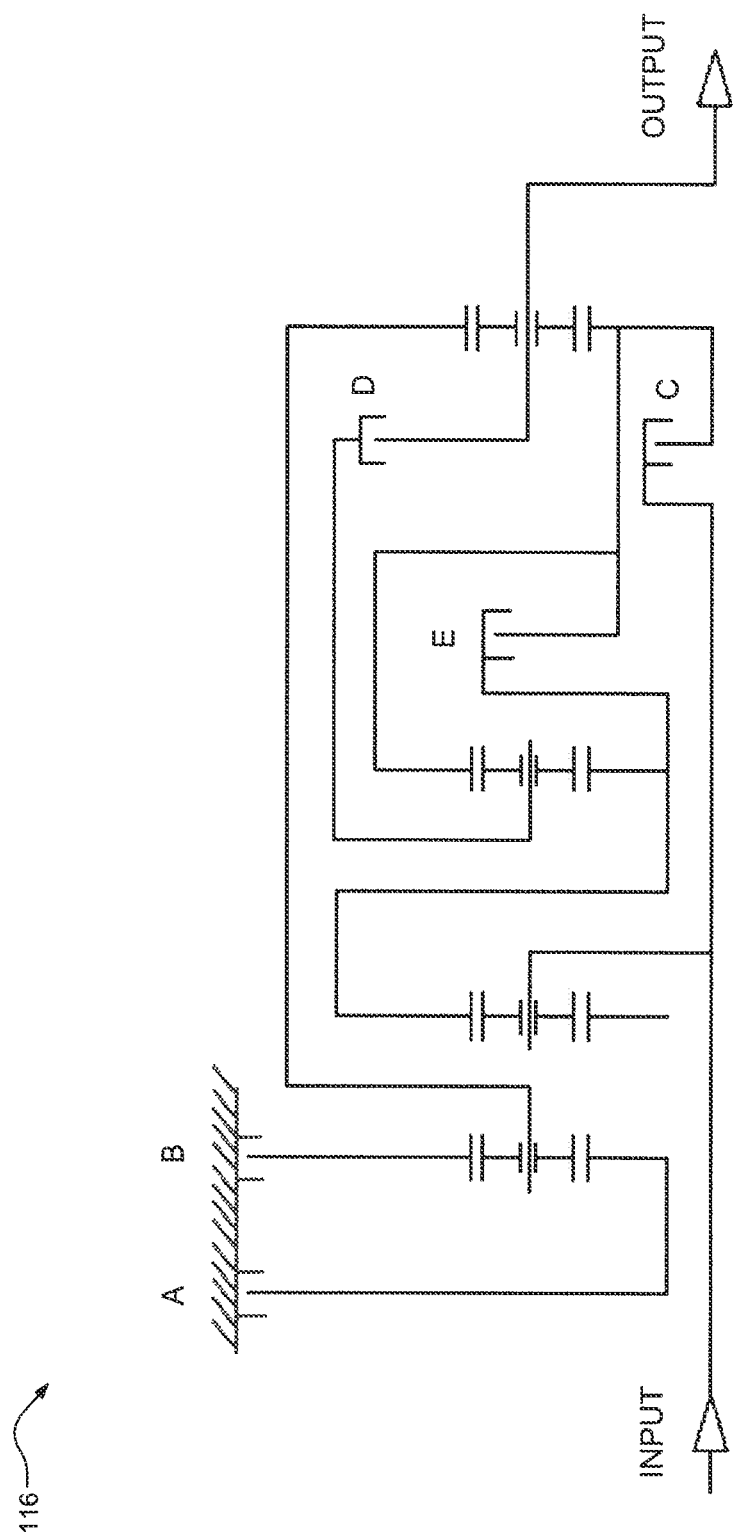
FIG. 2 is a schematic illustration of an example eight speed transmission according to the principles of the present disclosure.

In one exemplary implementation of the transmission 116 as illustrated in FIG. 2, three clutches 128 (A-E) are required to be activated/applied to make a gear (or establish power flow), as also shown in Table 1 below, and a unique, selective application of one or more available clutches 128 can be used to selectively provide transmission vehicle braking to assist in slowing down the vehicle 100 under various vehicle operating conditions. It will be understood that the term "application" as used immediately above and throughout, as well as the term "engagement" when referring to the one or more available clutches 128 can be referring to various different levels, amounts or states of application or engagement of the subject clutch or clutches 128, including a point of initial contact (e.g., a kiss point) up through various levels of subsequent engagement or application where the clutch 128 may still be slipping until full engagement or application, which is or substantially is the typical amount of clutch engagement for establishing torque capacity or power flow for a given transmission gear 132 (although the amount of time or duration of such engagement will be different, as described in greater detail herein).

In general, once it is determined that the entry conditions are met (e.g., based on signals from sensor(s) 124), the controller 120 will then determine how and to what extent to perform the transmission braking. For example, the controller 120 will then look at what transmission clutches 128 are available for transmission braking to be applied in a braking manner, given the current gear state. As previously discussed, clutches 128 being utilized to establish the current gear state are not available for transmission braking. For the example eight speed configuration discussed herein, the transmission includes five clutches (A-E), and requires various combinations of the three clutches to establish power flow for various gear states as illustrated in the table below. Thus, for this exemplary eight speed transmission, two clutches 128 would be available for selection for transmission braking, provided various other predetermined conditions are met or satisfied.

| Gear | Clutch A | Clutch B | Clutch C | Clutch D | Clutch E |
|---|---|---|---|---|---|
| 1st | X | X | X | | |
| 2nd | | X | X | | X |
| Lockup | X | | X | | X |
| 3rd | | X | X | | X |
| 4th | | X | | X | X |
| 5th | | X | X | X | |
| 6th | | | X | X | X |
| 7th | X | | X | X | |
| 8th | X | | | X | X |
| Reverse | X | X | | X | |
| Park/Neutral | X | X | | | |

Note that by applying clutches A, C, and E, it is also possible to intentionally lockup the transmission 116 (i.e., tie-up or lock up its powerflow) as shown by the "Lockup" configuration above. This could be utilized as an alternative to utilizing available clutches to achieve transmission braking. For example only, the vehicle 100 could be descending a mountain or another steep grade in $3^{rd}$ gear and the transmission braking mode could be manually or automatically engaged, which could include starting to turn off or disengage clutch B while also starting to at least partially turning on or engaging clutch A. The result would be the lockup state where power cannot flow through these three elements when applied together. Alternatively, for example only, the transmission 116 could be first shifted into a neutral state before then directly attempting to shift into the lockup state.

One of the primary predetermined conditions is clutch temperature. Clutch temperature is modeled or measured (e.g., by a thermocouple, thermistor, or other temperature modeling device) and then monitored both to determine if the available clutch 128 can be utilized for transmission braking as well as to determine if the clutch 128, once being utilized for transmission braking, needs to be discontinued due to excessive temperature. The clutch temperature can also be utilized, in one exemplary implementation, to determine the benefit of using an available clutch 128 for transmission braking. Any suitable clutch temperature model(s) could be utilized to determine the modeled clutch temperatures. Clutches 128 generally include operating temperature limits, or predetermined temperature limits, above which the clutch life and/or durability can be limited or otherwise compromised. Thus, the operating temperature of the available clutches 128 before and during transmission braking are monitored to determine if additional frictional or heat energy can be put into the clutch 128, and if excessive energy is being put into the clutch 128 during transmission braking, so as to signal that transmission braking with that clutch 128 should be temporarily discontinued and for how long. Alternatively, measured and/or modeled clutch temperature and modeled clutch energy (e.g., based on other measured parameters) could both be monitored to determine whether or not the transmission braking mode can be utilized. In yet another alternative, clutch temperature could be ignored and only modeled clutch energy could be utilized as the determining factor as to whether or not the transmission braking mode can be utilized (e.g., only available until a clutch energy limit is reached).

The application of the one or more available clutches 128 could be performed in a variety of different manners to achieve different levels of braking performance. This could include, for example, periodically applying or "pulsing" a single available clutch at either a partial pressure or a full pressure. It will be appreciated that a continuous partial of full application of this single available clutch may not fully achieve the desired transmission braking because the single available clutch is only capable of absorbing a certain amount of frictional energy at a given time. By periodically applying or pulsing a particular available clutch, it is able to absorb additional energy over time because cooler oil is repeatedly being provided thereto. Another potential strategy is to alternate the periodic application of (or intermittently apply) two or more available clutches at partial or full pressures, thereby further protecting available clutches from wear while also improving transmission braking performance by absorbing additional frictional energy. These rates/durations of application could be calibrated based on test data relating to the design of the transmission 116 and the clutches 128.

In another aspect of the present disclosure, the transmission braking mode could potentially be extended by shifting the transmission 116 to a different gear (e.g., a higher gear, such as from $4^{th}$ gear to $6^{th}$ gear) when a downshift (e.g., from $4^{th}$ gear to $3^{rd}$ gear) is not available. This process would be as follows. First, the controller 120 would determine a need to exit the transmission braking mode based on the set of at least one of clutch temperatures and energies for the set of available clutches for the current gear of the transmission 116. For example, at least some of these clutch temperatures and/or energies could be approaching or could have reached critical thresholds, and thus the transmission braking mode should be at least temporarily stopped to give the set of available clutches time to decrease their temperatures/energies in order to prevent potential component damage. The controller 120 could then determine whether there is a different gear (e.g., likely a higher gear) that the transmission 116 could be shifted to having a different set of available clutches with a different set of at least one of clutch temperatures and energies that would allow for extended transmission braking mode operation.

When the controller 120 determines that there is such a different gear with acceptable clutch parameters, the controller 120 could command a shift to the different gear and then continue the transmission braking mode including at least partially applying at least one clutch of the different set of available clutches to regulate vehicle speed/acceleration. When shifting to a higher gear (e.g., from $4^{th}$ gear to $6^{th}$ gear), the controller 120 would immediately begin at least partially applying the at least one clutch of the different set of available clutches after the gear shift is completed to prevent the vehicle 100 from potentially speeding up. Some of the different gears of the transmission 116 may even be more desirable due to their corresponding different sets of available clutches including clutches that are larger or more robust than the set of available clutches for the current gear. This process could continue once the controller 120 again detects a need to exit the transmission braking mode while in this different gear. That is, the controller 120 could again determine whether yet another gear of the transmission 116 has a corresponding set of available clutches with acceptable clutch parameters such that a gear shift thereto and corresponding available clutch application could be used to continue operation of the transmission braking mode. For example only, the controller 120 could potentially shift the transmission 116 back to the original gear (e.g., from $6^{th}$ gear to $4^{th}$ gear) to continue the transmission braking mode.

Figure 3A:
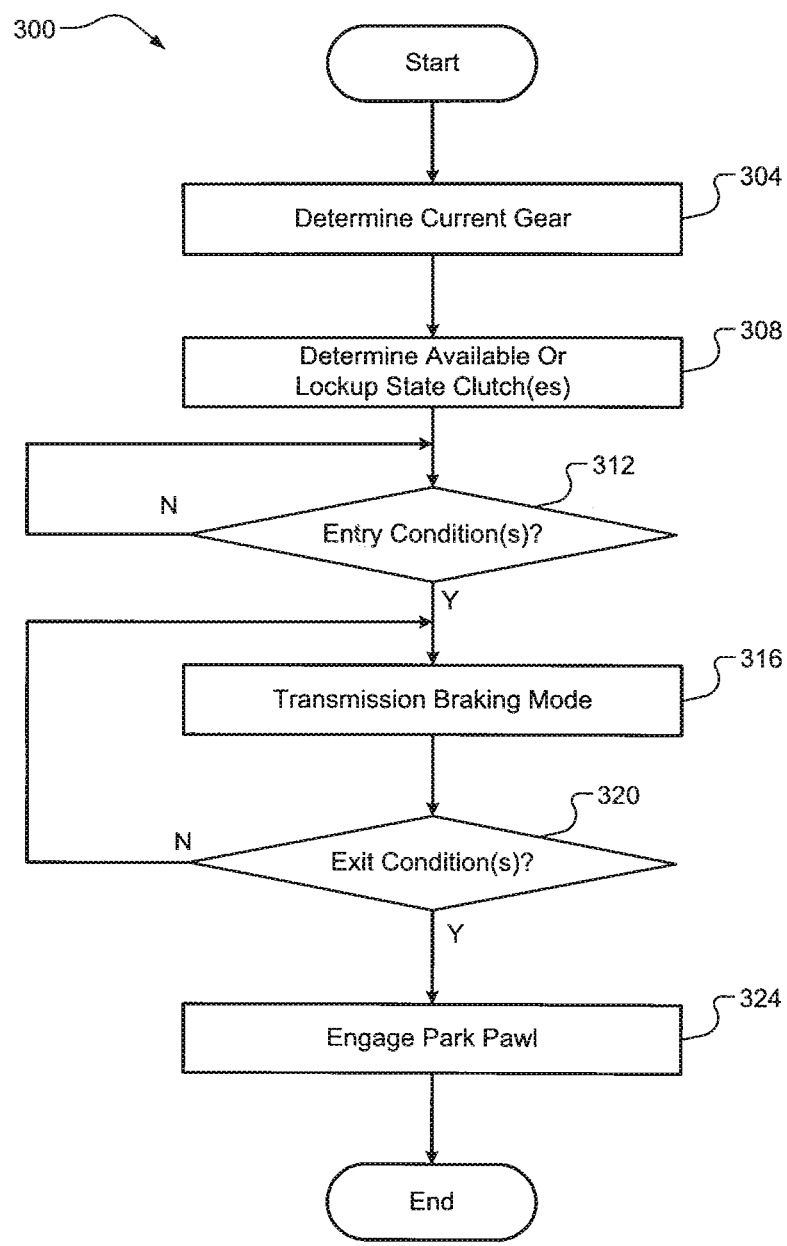
FIG. 3A is a flow diagram of an example method of utilizing the transmission braking mode for park pawl engagement according to the principles of the present disclosure.
Figure 3B:
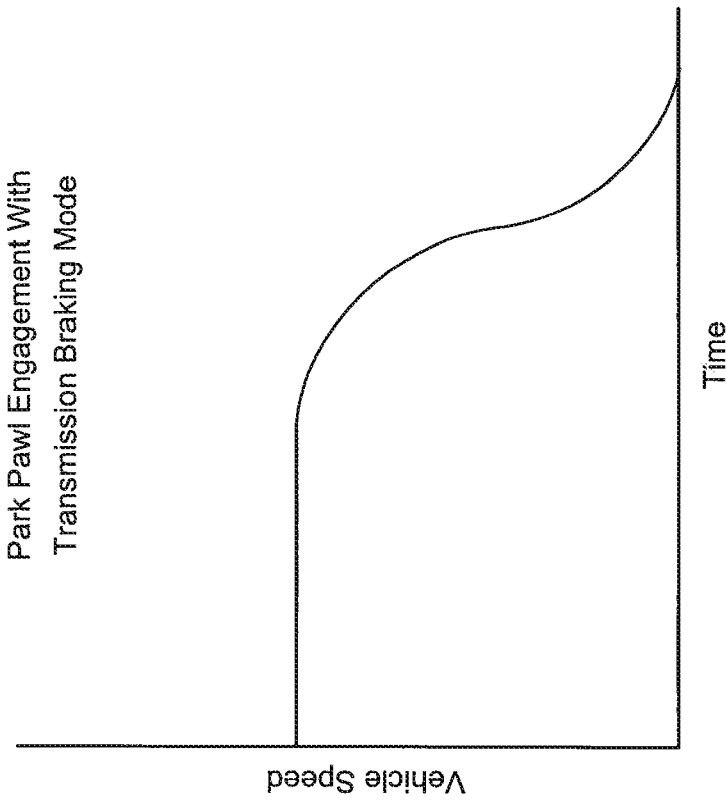
FIG. 3B is a graphical comparison of park pawl engagement with and without the transmission braking mode according to the principles of the present disclosure.
Figure 3B:
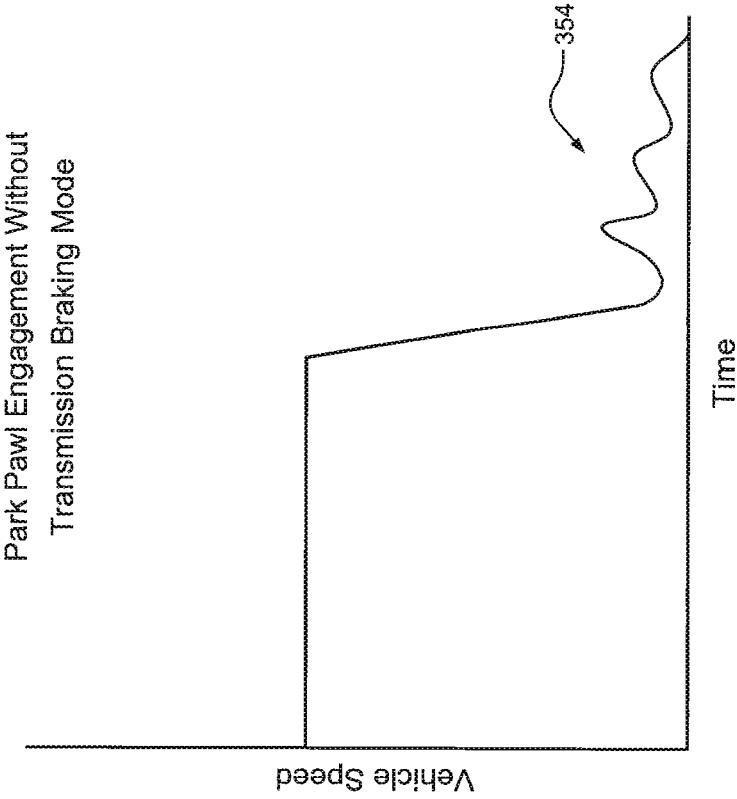

Referring now to FIGS. 3A-3B, a flow diagram of an example method 300 of utilizing the transmission braking mode for park pawl engagement and example plots 350 of park pawl engagement with and without the transmission braking mode are illustrated. At 304, the controller 120 determines the current gear 132 of the transmission 116. At 308, the controller 120 determines one or more available clutches 128 of the transmission 116 for the current gear 132 or the set of clutches 128 to achieve the lockup state of the transmission 116. At 312, the controller 120 determines whether one or more entry condition(s) for the transmission braking mode in connection with park pawl engagement are satisfied. In addition to the measured and/or modeled temperatures and/or modeled energy of at least one of the available clutches 128 being below the respective threshold(s), the entry condition(s) could include, for example only, the vehicle speed being within a certain speed range (e.g., greater than zero but less than a predetermined speed threshold) and a park request being received (e.g., a movement of a gear selector from drive/neutral/reverse into park). When the entry conditions are satisfied, the method 300 proceeds to 316. Otherwise, the method 300 ends or returns to 312 until the entry conditions are satisfied. At 316, the controller 120 operates the transmission 116 in the transmission braking mode to decrease or maintain vehicle speed.

At 320, the controller 120 determines whether one or more exit condition(s) for the transmission braking mode in connection with park pawl engagement are satisfied. When the exit conditions are satisfied, the method 300 proceeds to 324. Otherwise, the method 300 ends or returns to 316 where the transmission braking mode continues. In addition to the measured and/or modeled temperature and/or modeled energy of at least one of the available clutches 128 being utilized during the transmission braking mode exceeding respective threshold(s), the exit condition(s) could include, for example only, the vehicle speed falling below the certain speed range (e.g., zero or approximately zero). At 324, the controller 120 commands engagement of the park pawl system 140 stop the vehicle 100 and complete the shift into park and the method 300 then ends. In FIG. 3B, the left plot illustrates shock 354 (i.e., abrupt variation in vehicle speed) that occurs when park pawl engagement occurs when the vehicle is still moving. The right plot of FIG. 3B, on the other hand, illustrates smooth park pawl engagement (i.e., shock mitigation or elimination) by using the transmission braking mode prior to park pawl engagement).

Figure 4:
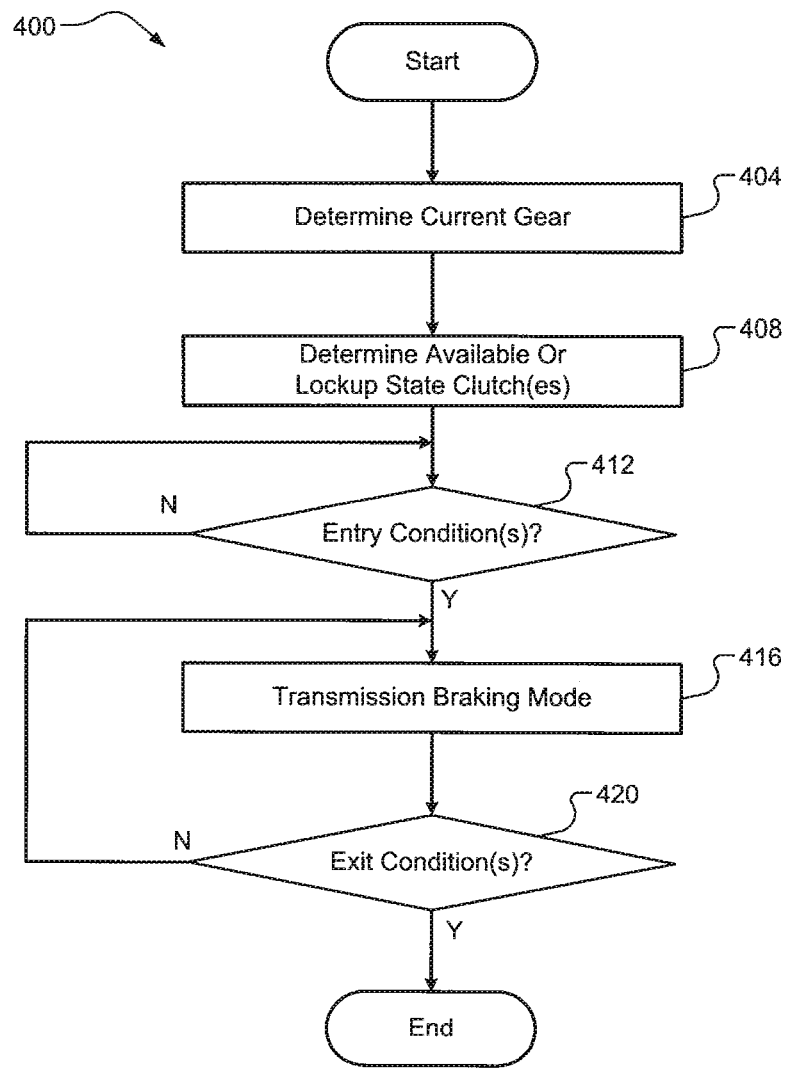
FIG. 4 is a flow diagram of an example method of utilizing the transmission braking mode for vehicle cruise control according to the principles of the present disclosure.

Referring now to FIG. 4, a flow diagram of an example method 400 of utilizing the transmission braking mode during vehicle cruise control (e.g., adaptive cruise control at a cruise control speed setpoint or exhaust or engine braking speed hold at a hold speed setpoint) is illustrated. At 404, the controller 120 determines the current gear 132 of the transmission 116. At 408, the controller 120 determines one or more available clutches 128 of the transmission 116 for the current gear 132 or the set of clutches 128 to achieve the lockup state of the transmission 116. At 412, the controller 120 determines whether one or more entry condition(s) for the transmission braking mode in connection with vehicle cruise control are satisfied. These entry condition(s) could include, for example only, cruise control being activated, vehicle speed being within a certain speed range (e.g., above a cruise control speed setpoint), and no driver input via accelerator/brake pedals. When the entry condition(s) are satisfied, the method 400 proceeds to 416. Otherwise, the method 400 ends or returns to 412. At 416, the controller 120 operates the transmission 116 in the transmission braking mode to decrease or maintain vehicle speed. At 420, the controller 120 determines whether one or more exit condition(s) for the transmission braking mode in connection with vehicle cruise control are satisfied. When the exit conditions are satisfied, the method 400 ends. Otherwise, the method 400 ends or returns to 416 where the transmission braking mode continues. In addition to the measured and/or modeled temperature and/or modeled energy of at least one of the available clutches 128 being utilized during the transmission braking mode exceeding respective threshold(s), the exit condition(s) could include, for example only, the vehicle speed falling to the cruise control speed setpoint or within a certain amount from the cruise control speed setpoint, cruise control being deactivated, or driver input via the accelerator/brake pedals.

Figure 5A:
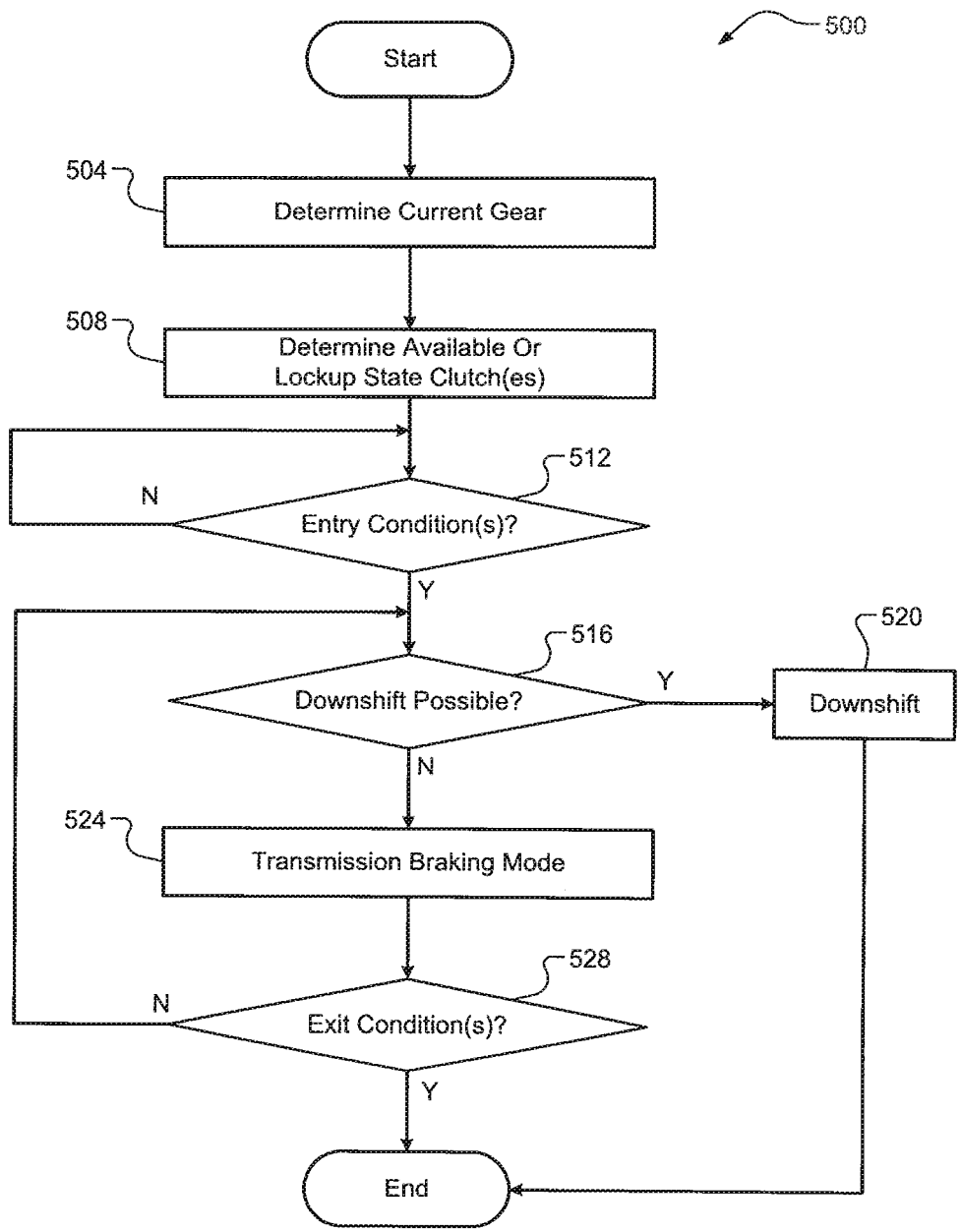
FIG. 5A a flow diagram of an example method of utilizing the transmission braking mode for vehicle downhill braking assistance according to the principles of the present disclosure.

Referring now to FIG. 5A, a flow diagram of an example method 500 of utilizing the transmission braking mode for vehicle downhill braking assistance is illustrated. At 504, the controller 120 determines the current gear 132 of the transmission 116. At 508, the controller 120 determines one or more available clutches 128 of the transmission 116 for the current gear 132 or the set of clutches 128 to achieve the lockup state of the transmission. At 512, the controller 120 determines whether one or more entry condition(s) for the transmission braking mode in connection with vehicle downhill braking assistance are satisfied. These entry condition(s) could include, for example only, a detected downhill grade, maximum brake pressure or brake pressure greater than a threshold, and vehicle speed continuing to increase and/or a vehicle speed reduction gradient or rate below a threshold (i.e., vehicle speed not decreasing fast enough). When the entry condition(s) are satisfied, the method 500 proceeds to 516. Otherwise, the method 500 ends or returns to 512. At 516, the controller 120 determines whether a downshift of the transmission 116 is possible (e.g., based on current shaft speeds). When possible, the controller 120 commands the transmission 116 to downshift at 520 and the method 500 ends. Otherwise, the method 500 proceeds to 524. It will be appreciated that step 516 could also be considered one of the entry condition(s) checked at 512. At 524, the controller 120 operates the transmission 116 in the transmission braking mode to decrease or maintain vehicle speed. At 528, the controller 120 determines whether one or more exit condition(s) for the transmission braking mode in connection with vehicle downhill braking assistance. When the exit conditions are satisfied, the method 500 ends. Otherwise, the method 500 ends or returns to 516 where the transmission braking mode continues. In addition to the measured and/or modeled temperature and/or modeled energy of at least one of the available clutches 128 being utilized during the transmission braking mode exceeding respective threshold(s), the exit condition(s) could include, for example only, the vehicle speed decreasing at an appropriate rate and/or brake pressure falling below a threshold.

Under the operating scenario where both available clutches 128 are under the temperature threshold(s), the controller 120 will determine an appropriate application strategy considering, for example only, vehicle load, road grade, any trailer or payload, vehicle speed, rate of vehicle speed increase, GPS indication of length of downhill travel remaining, if available, and modeled clutch temperatures. Initially, in one exemplary implementation, both available clutches 128 will be intermittently or periodically partially or fully applied to control clutch temperatures while monitoring the effectiveness of the strategy. This or a similar clutch application strategy will be maintained to the extent the vehicle is appropriately slowing down and the clutches 128 remain below the respective temperature and/or energy threshold(s). It will be appreciated that other strategies may be used considering the criteria above, including using only one available clutch 128, using one or both available clutches 128 with a greater partial application or, if speed and load will allow, full application of one or both available clutches 128.

Under the operating scenario where the transmission braking mode is successfully reducing the vehicle speed and the torque generating system speed to a point where the transmission 116 can be downshifted without over-revving the torque generating system 104 (e.g., an engine) or transmission components (e.g., when the transmission redline is lower than an engine redline), the transmission 116 is commanded by the controller 120 to do so. In FIG. 5A, this is represented by operating in the transmission braking mode at 524 and then looping back from 528 to 516 and determining again whether the transmission downshift is possible. The transmission braking mode can continue until the vehicle 100 is determined to be sufficiently reducing its speed and the brake system 136 is not under maximum braking pressure. In one exemplary implementation, to the extent the vehicle 100 continues to maintain its speed of traveling downhill too fast and/or the vehicle speed continues to increase, the transmission braking mode will be applied to its maximum extent using both available clutches 128 while adhering to the temperature threshold(s) for the two available clutches 128.

In an abnormal scenario such as those described previously herein (poor driver skill, poor vehicle maintenance, improver vehicle loading, etc.) where the above strategies do not result in the vehicle speed being reduced to an appropriate speed (e.g., full braking pressure by the braking system 136 is not adequately slowing the vehicle 100), and depending on various operating and event conditions, the temperature and/or energy threshold(s) for the available clutches 128 can be overridden in an effort to slow the vehicle 100. Examples of the operating and event conditions include one or more of the following: the vehicle speed is not decreasing, brake system temperature is above a predetermined maximum threshold, and/or GPS information indicates the grade continues for a predetermined amount. Overriding the clutch temperature and/or energy threshold(s) will provide additional braking, but at the risk of damaging the available clutches 128. Thus, this should only be considered as a possible last resort braking procedure. This could be either automatically enabled or enabled in response to a driver input via a driver interface (e.g., a braking request button).

In FIG. 5B, a plot of transmission braking mode performance in connection with vehicle downhill braking assistance is illustrated. At point 1, vehicle speed is increasing but the driver wants to slow down. At point 2, the driver applies the brakes 136. At point 3, the brakes 136 are not slowing down the vehicle 100 effectively. At points 4 and 5, it is determined that downshifting the transmission 116 would result in over-revving the torque generating system 104 (e.g., an engine) because speed (RPM) has exceeded a maximum speed for downshifting. At point 6, vehicle speed is continuing to increase even though the brakes 136 are at maximum pressure. At point 7, the transmission braking mode is enabled. At point 8, at least some of the OFF clutches are at least partially applied to cause vehicle speed reduction. At point 9, it can be seen that vehicle and torque generating system speeds are decreasing due to the transmission braking mode. At point 10, the torque generating system RPM falls below the maximum RPM for a transmission downshift. At point 11, the transmission 116 can now be safely downshifted for further vehicle speed reduction. At point 12, the transmission 116 is downshifted (e.g., from gear X to gear X−1, where X is greater than or equal to 2). At final point 13, the vehicle 100 is successfully in the lower gear and vehicle speed is reduced to an acceptable level without requiring maximum pressure by the brakes 136.

Figure 6:
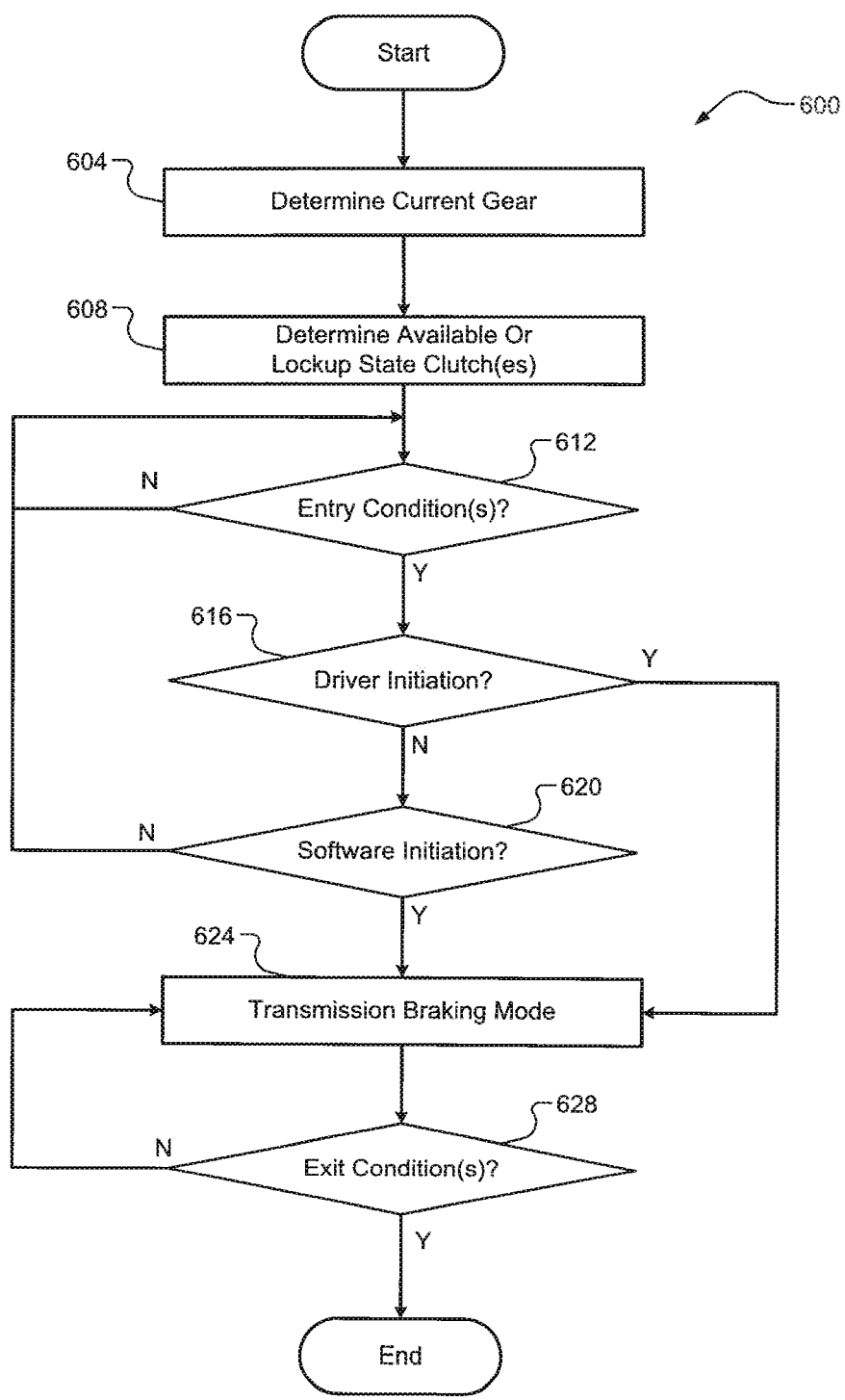
FIG. 6 is a flow diagram of an example method for a driver-initiated or software-initiated transmission braking mode for a vehicle according to the principles of the present disclosure.

Referring now to FIG. 6, a flow diagram of an example method of a driver-initiated or software-initiated transmission braking mode is illustrated. This could be, for example only, for use in an abnormal scenario, such as those previously described herein (poor driver skill, poor vehicle maintenance, improver vehicle loading, etc.). At 604, the controller 120 determines the current gear 132 of the transmission 116. At 608, the controller 120 determines one or more available clutches 128 of the transmission 116 for the current gear 132 or the set of clutches 128 to achieve the lockup state of the transmission. At 612, the controller 120 determines whether one or more entry condition(s) for the transmission braking mode are satisfied. These entry condition(s) could include, for example only, measured and/or modeled clutch temperature and/or modeled energy being below respective threshold limits. When satisfied, the method 600 proceeds to 616. Otherwise, the method 600 ends or returns to 612 until the condition(s) are satisfied. At 616, the controller 120 determines whether the driver of the vehicle 100 has manually initiated the transmission braking mode (e.g., in response to an input via a button/switch or some other device). When true, the method 600 proceeds to 624 where the transmission braking mode is activated.

When false, however, the method 600 proceeds to 620 where the controller 120 determines whether overwatch software (e.g., a monitoring routine or algorithm) has determined the need to activate the transmission braking mode. This could include, for example only, a detected downhill grade, maximum brake pressure or brake pressure greater than a threshold, and vehicle speed continuing to increase. This could also include other parameters, such as exhaust braking being active and the vehicle speed continuing to increase. When 620 is true, the method 600 proceeds to 624 where the transmission braking mode is activated. Otherwise, the method 600 ends or returns to 612. At 628, the controller 120 determines whether one or more exit conditions for the transmission braking mode are satisfied. When false, the method 624 returns to 620 and the transmission braking mode continues. When true, however, the method 600 ends or returns to 604. In addition to the measured and/or modeled temperature and/or modeled energy of at least one of the available clutches 128 being utilized during the transmission braking mode exceeding the temperature threshold(s), the exit condition(s) could include, for example only, the vehicle speed decreasing at an appropriate rate and/or brake pressure falling below a threshold.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A transmission braking system for a vehicle, the system comprising:

an automatic transmission having a plurality of clutches and a plurality of forward gears, the automatic transmission being adapted to transfer drive torque from a torque generating system of the vehicle to a driveline of the vehicle; and a controller configured to:

determine a set of available clutches of the plurality of clutches that are not being utilized for engagement of a particular forward gear of the plurality of forward gears, determine at least one of a modeled temperature, a measured temperature, and a modeled energy of each clutch of the set of available clutches to obtain a set of at least one of clutch temperatures and energies, and based on at least the set of available clutches and the set of at least one of clutch temperatures and energies, selectively operate the transmission in a transmission braking mode that includes at least partially applying at least one clutch of the set of available clutches to mitigate or prevent powerflow through the transmission and thereby decrease or maintain a speed of the vehicle and/or reduce acceleration of the vehicle.

2. The system of claim 1, wherein the particular forward gear is a currently active forward gear of the plurality of forward gears of the transmission,
   wherein the transmission braking mode includes at least partially applying the at least one clutch of the set of available clutches while the transmission remains in the currently active forward gear to thereby absorb frictional energy in the transmission, and
   wherein at least partially applying the at least one clutch of the set of available clutches while the transmission remains in the currently active forward gear provides at least a partial lockup state of the transmission whereby powerflow therethrough is mitigated or prevented.

3. The system of claim 2, wherein the set of available clutches comprises at least a first available clutch and at least one second available clutch, and wherein the controller is configured to periodically and intermittently at least partially apply the first and the at least one second available clutch.

4. The system of claim 2, wherein the controller is further configured to:
   based on at least the set of available clutches and the set of at least one of clutch temperatures and energies, determine a need to exit the transmission braking mode;
   in response to determining the need to exit the transmission braking mode:
      determine a different set of available clutches that would be available in a different forward gear of the transmission,
      determine at least one of a modeled temperature, a measured temperature, and a modeled energy of each clutch of the different set of available clutches to obtain a different set of at least one of clutch temperatures and energies, and
      based on at least the different set of available clutches and the different set of at least one of clutch temperatures and energies, determine whether the transmission braking mode could be extended by shifting the transmission to the different forward gear; and
   when the transmission braking mode can be extended by shifting the transmission to the different forward gear:
      command the transmission to shift to the different forward gear, and
      based on at least the different set of available clutches and the different set of at least one of clutch temperatures and energies, at least temporarily continue operating the transmission in the transmission braking mode including at least partially applying at least one clutch of the different set of available clutches to thereby absorb frictional energy and decrease or maintain the speed of the vehicle and/or reduce acceleration of the vehicle.

5. The system of claim 1, wherein the transmission braking mode further comprises the controller at least partially disengaging at least one clutch that was being utilized for engagement of the particular forward gear of the transmission to provide at least a partial lockup state of the transmission whereby the powerflow therethrough is mitigated or prevented.

6. The system of claim 5, wherein engagement of a different set of the plurality of clutches is required to establish powerflow in each of the plurality of forward gears, and wherein engagement of a unique set of the plurality of clutches not utilized to generate powerflow in any of the plurality of forward gears generates the at least partial lockup state of the transmission.

7. The system of claim 6, wherein the transmission comprises eight forward gears and five clutches.

8. The system of claim 1, wherein the controller is further configured to:
   detect a park request provided by a driver of the vehicle or generated by an auto-park feature of the vehicle;
   when the park request is detected and the vehicle speed is above a park speed threshold, operate the transmission in the transmission braking mode to decrease the vehicle speed to zero or within a threshold from zero; and
   upon the vehicle speed decreasing to zero or within the threshold from zero, engage a park pawl system to stop the vehicle.

9. The system of claim 1, wherein the controller is further configured to:
   determine whether a cruise control mode of the vehicle is active; and
   when the cruise control mode of the vehicle is active and the vehicle speed is above a cruise control speed setpoint, operate the transmission in the transmission braking mode to decrease the vehicle speed to the cruise control speed setpoint or within a threshold from the cruise control speed setpoint.

10. The system of claim 1, wherein the controller is further configured to:
   determine whether an exhaust braking speed hold mode of the vehicle is active; and
   when the exhaust braking speed hold mode of the vehicle is active, operate the transmission in the transmission braking mode to decrease the vehicle speed to a speed hold setpoint or within a threshold from the speed hold setpoint.

11. The system of claim 1, wherein the controller is further configured to:
   determine whether an engine braking speed hold mode of the vehicle is active; and
   when the engine braking speed hold mode of the vehicle is active, operate the transmission in the transmission braking mode to decrease the vehicle speed to a speed hold setpoint or within a threshold from the speed hold setpoint.

12. The system of claim 1, wherein the controller is configured to operate the transmission in the transmission braking mode when the vehicle is traveling downhill and a downshift of the transmission cannot be performed.

13. The system of claim 1, wherein the controller is configured to operate the transmission in the transmission braking mode in response to a manual activation request provided by a driver of the vehicle.

* * * * *